（12）United States Patent
Duerr et al.

(10) Patent No.: US 6,343,485 B1
(45) Date of Patent: Feb. 5, 2002

(54) COLD STORAGE UNIT

(75) Inventors: Gottfried Duerr; Guenther Feuerecker; Karl Fulterer; Hans-Dieter Hinderberger, all of Stuttgart; Dietrich Klingler, Heubach; Kurt Molt, Bietigheim-Bissingen; Juergen Otto, Illingen; Wolfgang Reier, Schwaikheim; Ulrich Salzer, Renningen; Dieter Schmadl, Marbach; Markus Schmid, Wernau; Werner Schwahn, Schwieberdingen; Luay Ghussein, Stuttgart; Werner Rauland, Pforzheim, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/457,705

(22) Filed: Dec. 10, 1999

(30) Foreign Application Priority Data

Dec. 11, 1998 (DE) .......................................... 198 57 121
Oct. 21, 1999 (DE) .......................................... 199 50 673

(51) Int. Cl.[7] ............................................... F25D 17/02
(52) U.S. Cl. ........................................... 62/434; 62/430
(58) Field of Search ........................... 62/430, 434, 530, 62/114

(56) References Cited

U.S. PATENT DOCUMENTS

| 2,936,741 A | * | 5/1960 | Telkes | 122/32 |
| 4,393,918 A | | 7/1983 | Patry | 165/10 |
| 4,462,224 A | * | 7/1984 | Dunshee et al. | 62/530 |
| 4,817,704 A | * | 4/1989 | Yamashita | 165/10 |
| 5,239,839 A | * | 8/1993 | James | 62/434 |
| 5,561,986 A | * | 10/1996 | Goodall | 62/406 |

FOREIGN PATENT DOCUMENTS

JP   1-219466   *  2/1988  .................. 62/430

* cited by examiner

Primary Examiner—Henry Bennett
Assistant Examiner—Melvin Jones
(74) Attorney, Agent, or Firm—Foley & Lardner

(57) ABSTRACT

A cooling apparatus is disclosed which includes a housing and a plurality of chambers which are arranged therein, sealed tightly and filled with a storage medium. The chambers have a substantially flat cross section and are arranged in at least one group. Passages extend between the chambers. The chambers of a group are combined to form a block, and at least one passage is provided between each pair of adjacent chambers. Each of the passages is connected to distribution and collection chambers formed in the housing, in the area of the distribution and collection chambers, with at least one feed port and a return port.

37 Claims, 15 Drawing Sheets

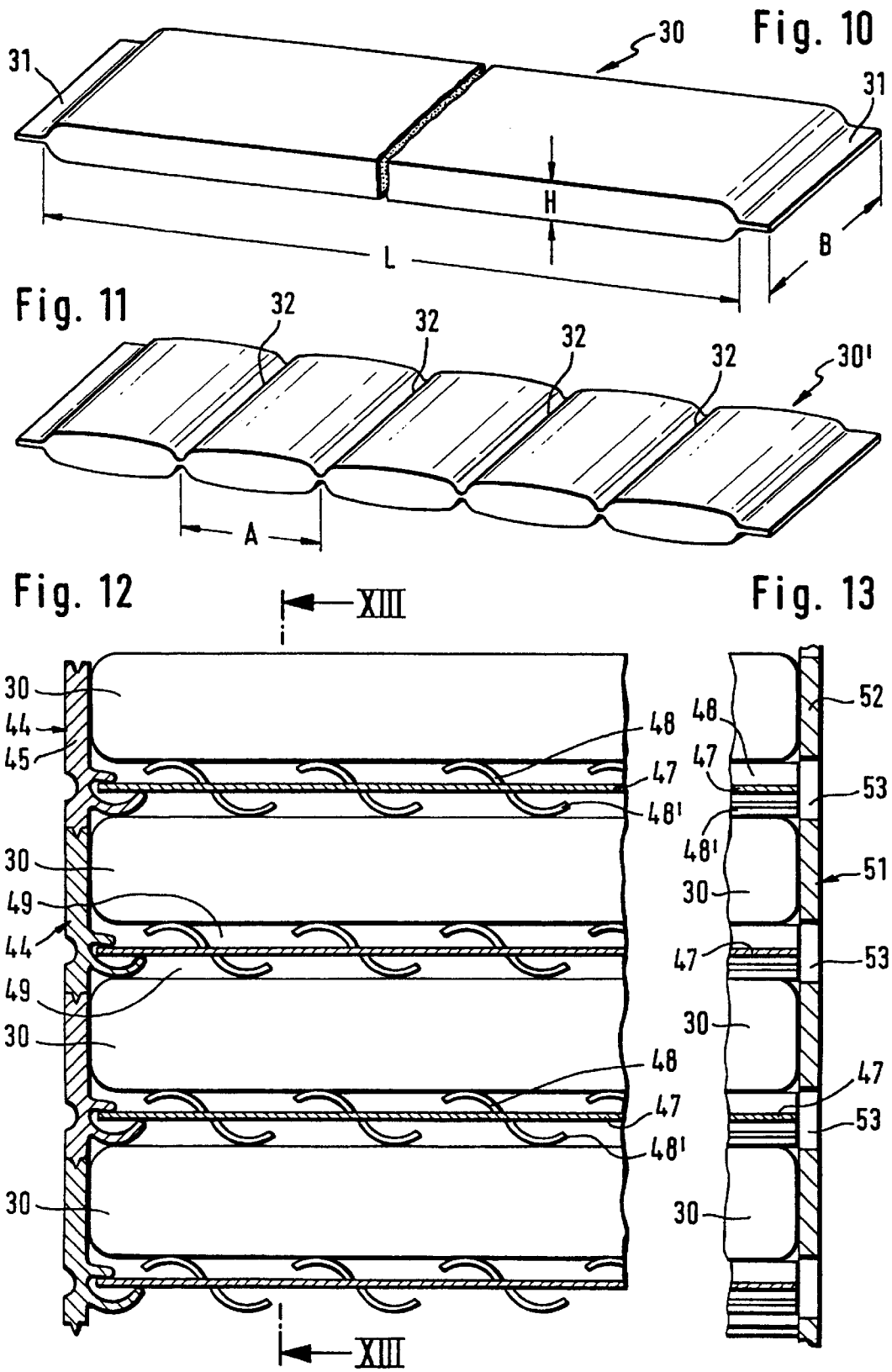

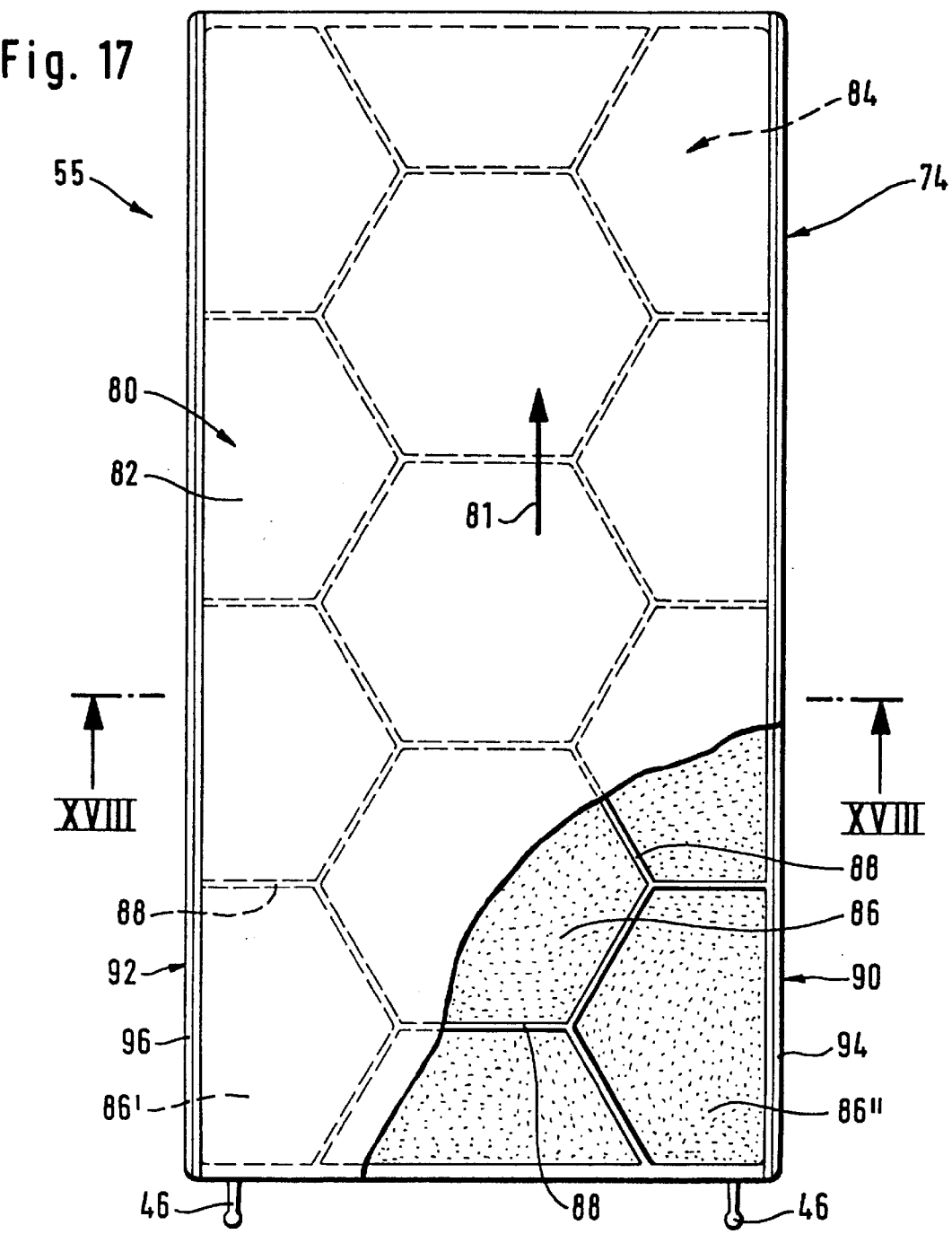
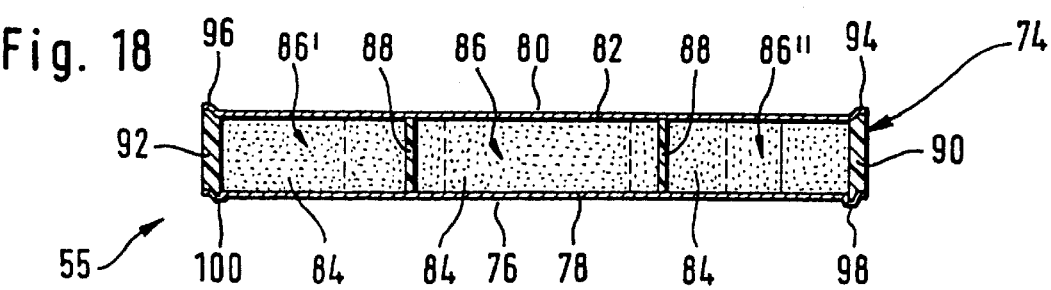

COLD STORAGE UNIT

BACKGROUND OF THE INVENTION

1. Field of the Invention

The invention relates to a cooling apparatus, in particular for the air-conditioning of a vehicle passenger compartment. The cooling apparatus includes a housing and a plurality of chambers arranged therein, sealed tightly and filled with a storage medium. The chambers are combined to form a block and at least one passage is provided between each pair of adjacent chambers. Each of the passages is connected to distribution and collection chambers formed in the housing with at least one feed port and a return port.

2. Description of the Related Art

U.S. Pat. Ser. No. 5,644,929 relates to a cooling apparatus for a vehicle cabin. The cooling apparatus includes a heat regenerating evaporator encased in a case and provided with a tube for a cooling medium and a heat regenerating pack arranged to be in close contact with the outer surface of the tube of the heat regenerating evaporator. The heat regenerating evaporator conducts a refrigeration cycle while a vehicle is running and cools the heat regenerating pack to freeze the heat regenerating material within the pack. When the vehicle is parked, a blower is operated to produce a current of air that is cooled by the heat regenerating pack due to heat exchange between the current of air and the frozen heat regenerating material in the heat regenerating pack. The cold air is blown out into an selected cooling area, such as a sleeping area of the vehicle, from a vent so that the selected cooling area is air-conditioned.

European Patent No. 839,679-A2 relates to a device for cooling a vehicle passenger compartment. The device includes a first coolant circuit which has a compressor, a condenser and at least one evaporator. In addition, there is a second coolant circuit which includes at least a second evaporator connected to an ice reservoir to form a structural unit. There are also valve means, by which the evaporator arranged in the ice reservoir can be operated in parallel with the evaporator of the air-conditioning unit. According to the patent, there is provision for the structural unit including the ice reservoir and second evaporator to be arranged as a sheet-like element in a wall of the vehicle passenger compartment and to provide air-guide ducts which allow direct heat exchange with the air fed to the passenger compartment of the vehicle.

The prior arrangements require considerable construction outlay, in particular with regard to the additional components of the coolant circuit, and this has an adverse effect on production costs. Moreover, it is difficult to insulate the prior cooling apparatus, owing to the air-guide ducts.

SUMMARY OF THE INVENTION

An object of the invention is to overcome the disadvantages of the known art. The present invention is based on the object of providing a cooling apparatus of the generic type which allows the construction outlay to be reduced and makes the accumulator more versatile.

One object of the present invention is to provide a cooling apparatus which includes a housing having a plurality of chambers arranged therein, wherein the chambers are sealed tightly and are filled with a storage medium; passages which carry a heat-transfer medium and extend between the chambers, the chambers of a group being combined to form a block; and at least one passage provided between each pair of adjacent chambers, wherein each of the passages is connected to distribution and collection chambers formed in the housing and wherein the housing includes at least one feed port and at least one return port.

In one aspect of the invention, the cooling apparatus includes components of simple structure that can be well insulated against thermal radiation. The cooling apparatus is charged and discharged by means of a single heat-transfer medium, so that only connections and feed lines for a single heat-transfer medium are required. To facilitate handling during installation in the housing and while securing its position therein, it is desired that the chambers are held at a predetermined distance apart by support means. Preferably, two or more blocks may be arranged side-by-side next to one another or above one another, according to the desired storage capacity in the housing. This arrangement of blocks leads to a modular structure of standardized components, by which it is possible to take suitable account of the conditions required. The housing preferably has a substantially cuboid-shaped and is provided with an attachment means.

In another aspect of the invention, the apparatus includes four side walls and a base of the housing that form a box-like component which, on its side opposite from the base, forms an insertion opening through which the block or blocks can be inserted. The insertion opening is closed in a sealed manner by a cover. According to one embodiment of the housing, the latter is made from aluminum sheet, while the wall parts and the base are preferably connected to one another by a material-to-material bond and are therefore sealed together. The housing may be surrounded by an insulating jacket or, in the case of a sandwich structure, may be filled with insulating material, to minimize thermal losses. As an alternative, the housing may be formed of a plastic material which, if it is of suitable wall thickness, has a thermally insulating action. A representative wall thickness is preferably between about 20 mm and about 30 mm. The housing can be easily produced in a single piece so that only the cover needs to be produced as an individual component and subsequently fitted, thereby improving manufacturing of the device.

Another object of the invention is to provide a housing which includes an end side which faces the distribution or collection chamber forming the insertion opening, while all the other sides are closed housings. In this embodiment, the outer wall of the distribution or collection chamber functions as the cover and can be fitted and sealed on the device. In the case of plastic housings, the cover and housing can be connected in a sealed manner by a suitable welding process. Possible alternatives to welding process include adhesive bonding or a mechanical connection, for example, bracing, in which case a seal may have to be added.

According to another aspect of the invention, the storage medium in the chambers is preferably tap water, in which case the chambers are to maintain, in addition to the storage medium, a residual gas volume of preferably from about 10% to about 20%. This residual volume is advantageous in view of the change in volume of the storage medium during phase transition. As an alternative, it is also possible to provide an absorbent material, such as for example a non-woven or cellulosic material, in which case the absorbent material is completely impregnated and then placed into the chambers.

It is also an object of the invention to be able to handle the storage medium easily during manufacturing. To achieve this object, the storage medium may include a mixture of water with a gelling agent. The storage medium, which is in a gel form at room temperature, may then be introduced into the individual chambers of the containers. The thickening agent has an additional advantage in reducing the amount of steam which may be formed as a result of the introduction of heat when the cover is sealed to the frame, thereby increasing the strength of the weld or seal seam. The gelling agent used is preferably a hydrogel material and more preferably includes a crosslinked, partially neutralized polyacrylic acid. The hydrogel is preferably present in the storage medium in an amount of from about 0.5% by weight to about 30% by weight of the storage medium, most preferably between about 1% by weight and about 2% by weight of the storage medium. These ratios have proven to represent a particularly appropriate compromise between the storage capacity of the storage medium, on the one hand, and its processibility, on the other hand. However, it should be understood that the invention is not so limited.

In yet another aspect of the invention, the chambers may be designed as cold storage elements which have a dimensionally stable frame, the frame being spanned on both sides by a cover to form the cold storage apparatus. Cold storage elements which are designed in this way may advantageously be stacked without further, separate intermediate elements. Thus, it is possible to dispense with the spacers to form flow passages. This alone makes it possible to produce the cooling apparatus at considerably lower cost, since to construct the cold storage apparatus it is only necessary for the chambers, which have been filled with a storage medium and closed to then be stacked above one another in the housing of the cooling apparatus. Therefore, in this alternative arrangement, the cooling apparatus elements are able to perform the three main functions, namely, holding the storage medium, forming the flow passages and fixing the position of the cooling apparatus elements inside the housing. The modular structure makes it possible to produce a wide range of structural forms, since, for example, it is possible to arrange a plurality of stacks of cooling apparatus elements next to one another.

It is another object of the invention to provide an apparatus by stacking the chambers directly in the housing of the cooling apparatus, without intermediate elements to achieve a greater packing density for a given volume. Thus, the space required by the cooling apparatus can be reduced while maintaining a constant output capacity. Furthermore, it is possible to increase the capacity of the cooling apparatus compared to cooling apparatus of the prior art while still achieving a reduction in the space required. The chambers, with their dimensionally stable frames, are easy to handle in terms of manufacturing technology, so that it is possible to automate assembly of the cooling apparatus and thus to manufacture the accumulator at lower cost.

In another aspect of the invention, the stability and ease of handling of the chambers are further improved by support webs that are arranged inside the frame. The support webs are advantageously of the same height as the frame, such that individual spaces are formed inside the chamber when the cover is connected to the frame and the support webs. The volume of storage medium which is held in the cold storage element may then divided into smaller volumes, so that it is possible to avoid or reduce sloshing noises when the cooling apparatus moves, for example, when driving. Also, smaller volumes are easier to handle in the event of automated filling of the chambers with the storage medium. A further advantage of the support webs is the improved strength of the cover, which is connected to the support webs. Furthermore, the formation of chambers ensures that the cooling apparatus will function reliably even when it deviates from a preferably horizontal position, and in particular during freezing.

The cover used may be an inexpensive flexible laminated film or foil, preferably an aluminum composite foil. A foil of this nature on the one hand fulfills the requirement for a highly flexible cover, in order to be able to accommodate the expansion caused by temperature-related changes in volume of the storage medium. On the other hand, the low diffusion rates which are required for long-term operation can be achieved.

In principle, the individual chambers may be of any desired shape. For strength reasons, it is preferable for the support webs to be arranged in such a way that the chambers have a hexagonal contour.

In another aspect of the invention, flow passages for the heat-transfer medium are formed between the stacked cooling apparatus elements by suitable shaping of the frame. For this purpose, spacers may be provided on the frame, which spacers are preferably designed, in the most simple way, as web-like elevations which run on the longitudinal sides in the direction of flow. If the spacers are arranged in such a manner that cooling apparatus elements which are stacked above one another are held in a fixed position in the transverse direction with respect to the elevations, the cooling apparatus elements are thus fixed in place relative to one another.

In another aspect of the invention, support elements may be arranged on the outside of the frame. Thus, it is possible for the cooling apparatus element to be held fixed in position relative to the housing. The cooling apparatus then essentially comprises only the housing and the cooling apparatus elements which are inserted in the housing by simple stacking.

According to yet another aspect of the invention, the chambers may include a flexible enclosure made from plastic material, where the ends of the enclosures are welded, bonded or sealed together in another suitable way. Depending on the nature of the plastic enclosure, it may be advantageous to fix the flat sides of the enclosure together at predetermined intervals, for example, in such a way that a plurality of joined cushions are formed from one enclosure. Therefore, in the case of enclosures which are made from material which is not dimensionally stable, the length of the individual chambers is limited. This can reduce the geodetic loads on a slope, for example, when driving uphill or downhill. Flattened tubes which serve as passages for the heat-transfer medium are expediently provided as support means between the enclosures.

If a greater block depth, that is to say the longitudinal extent in the direction of flow of the heat-transfer medium, is provided, at least two flexible enclosures may be arranged behind one another in the longitudinal direction of the passages. If appropriate, measures can be taken to fix the position of the enclosures in the longitudinal direction.

It is another object of the invention to provide a particularly suitable structure of a block which includes chambers and passages having two parallel side strips and, between them, a bearing section for the enclosures are provided, in which case the profile elements are stacked on top of one another. The bearing section may be corrugated in cross section, in which case the enclosures contact the corrugation peaks, and intermediate spacers which serve as passages for the heat-transfer medium may be formed between the corrugation valleys and the enclosures. Another configuration of the bearing section includes an elongate web between the side strips and provides support elements formed integrally on the top side and the underside, in which case the enclosures contact the support elements, and the passages for the heat-transfer medium are formed between these support elements on each side.

The cooling apparatus can be adapted to any particular installation conditions, i.e. the space available, in a simple manner. Account is also taken of what length of passages for the heat-transfer medium is appropriate to achieve an optimum heat exchange. The length of the chambers may be between about 200 mm and about 300 mm, preferably from about 250 mm to about 260 mm. The width of the chambers may be from about 100 mm to about 150 mm, preferably about 125 mm, and their height of the chambers may be from about 10 mm to about 20 mm, preferably about 14 mm.

The heat-transfer medium used maybe , for example, a glycol mixture, the freezing point of which is suitably low. However, other cooling agents may also be suitable, in particular salt solutions which, for reasons of corrosion resistance, may be in the form of NaCl, $CaCl_2$ or $MgCl_2$.

The above and other advantages and features of the invention will be more clearly understood from the following detailed description of preferred embodiments which is provided in connection with the accompanying drawings.

BRIEF DESCRIPTION OF THE DRAWINGS

FIG. 10 illustrates a first embodiment of a chamber for the storage medium.

FIG. 11 illustrates a second embodiment of a chamber for the storage medium.

FIG. 12 illustrates a section through a block with a further form of profile elements.

FIG. 13 illustrates a section view from the line XIII—XIII in FIG. 12.

FIG. 17 illustrates a plan view of a cooling apparatus element which forms the chamber for the storage medium.

FIG. 18 illustrates part of a longitudinal section through the storage element as shown in FIG. 17.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that changes may be made without departing from the spirit and scope of the present invention.

Figure 1:
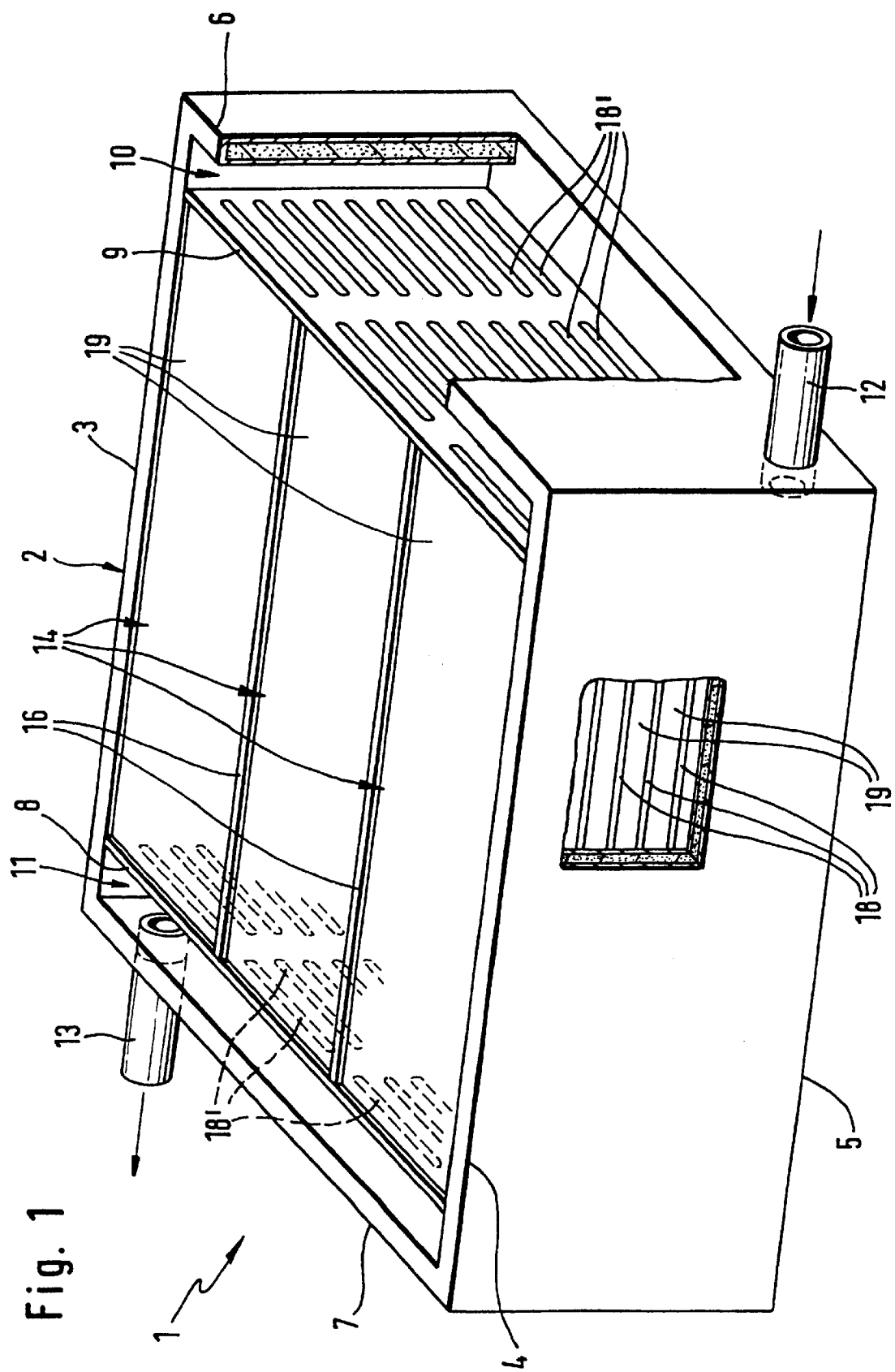
FIG. 1 illustrates a perspective view of a cooling apparatus according to the present invention.

FIG. 1 shows a perspective view of a cooling apparatus 1 with a housing 2, the top side of which is not shown in this figure. The housing 2 is of sandwich-like structure. While the housing is shown as a sandwich-like structure it should be understood that the invention is not so limited. The housing 2 is preferably composed of an outer plate and an inner plate. Preferably the plates are formed of aluminum. A hardenable foam is formed between the inner and outer plates. The apparatus 1 includes a base 5 with side walls 3, 4 running in a longitudinal direction and end-side walls 6, 7. A partition 9 is parallel to and at a predetermined distance from the end-side wall 6. A distribution chamber 10, on which a feed port 12 for a heat-transfer medium is arranged, is formed in the space between the end-side wall 6 and the partition 9. A partition 8 is parallel to the end-side wall 7. A collection chamber 11 for the heat-transfer medium is formed in the space between the walls 7 and 8. A return port 13 is an outlet for the collection chamber 11.

A plurality of partitions 16 run parallel to the walls 3, 4 on the longitudinal sides and divide the interior of the housing 2 into a plurality of block receptacles 14. Partitions 16 extend between the partitions 8 and 9, and the blocks include a plurality of shallow passages 18 extending between the side walls 7 and 8 and chambers 19. Chambers 19 are in thermally conductive communication with the passages and are filled with a storage medium. Slots are formed in the partitions 8 and 9, through which slots the ends 18' of the passages 18 open into the distribution and collection chambers 10, 11 respectively. An insertion opening, through which all the block receptacles 14 are accessible in order to introduce the blocks (as described in more detail below) into the housing, is formed on the top side of the housing 2. After the housing has been filled with the storage medium, the insertion opening is closed and sealed by a cover (not shown in FIG. 1).

Figure 2:
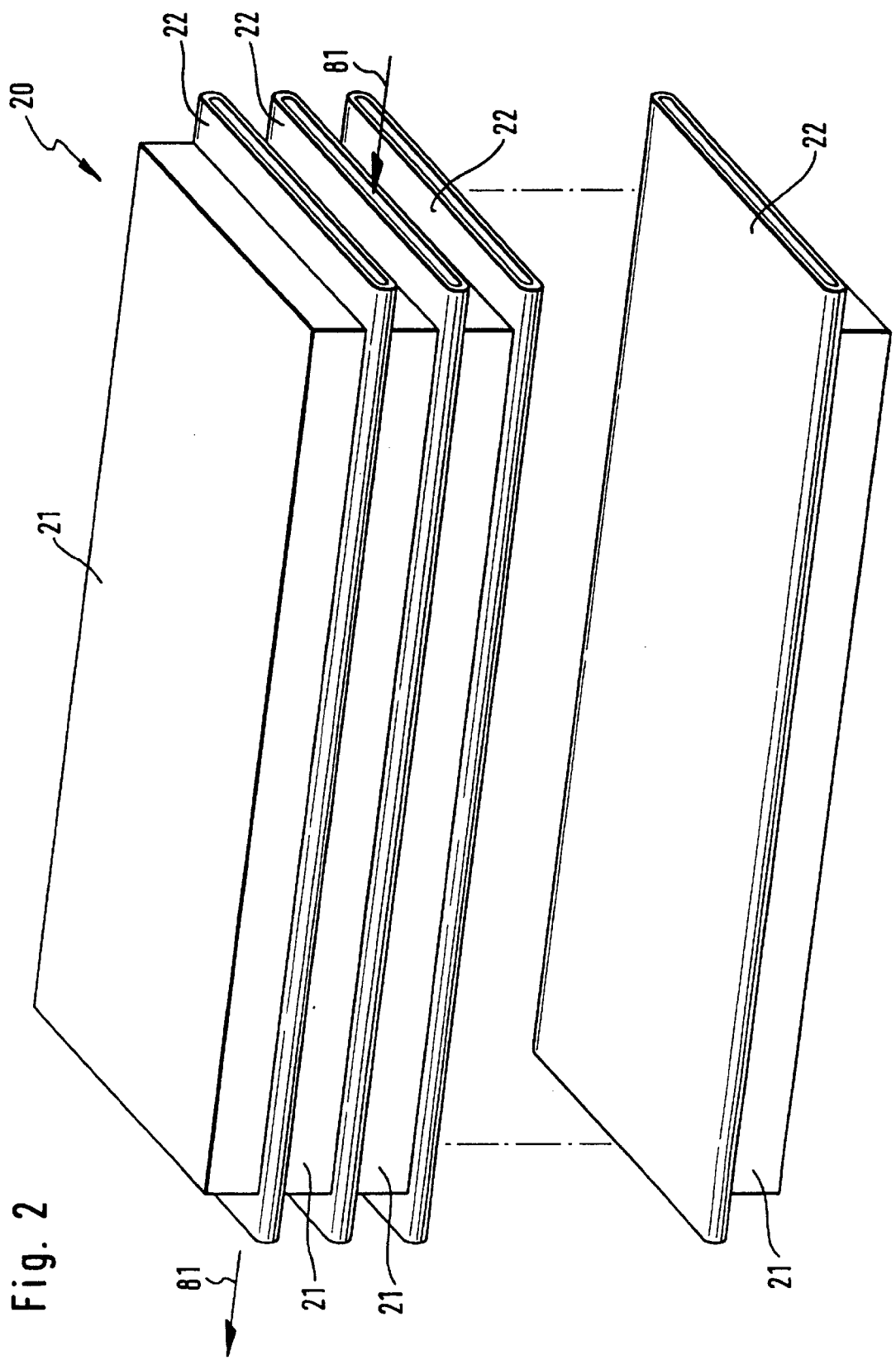
FIG. 2 illustrates a perspective illustration of a block formed from storage elements and passages.

FIG. 2 shows a perspective illustration of a block 20 which is formed from storage elements and passages and is intended to be inserted into the block receptacle 14 of the housing 2 as illustrated in FIG. 1. The block 20 includes an alternating stack of enclosures 21 and flattened tubes 22. The flattened tubes 22 are aligned above one another as shown in the figure. The enclosures 21 each contact the two adjacent flattened tubes 22 over a large surface area and are therefore in good thermally conductive communication with the flattened tubes 22. The chambers 19 for holding the storage medium are formed in the enclosures 21, and the flattened tubes 22, which are open on the end sides, serve as passages 18 for the heat-transfer medium. The heat-transfer medium used is preferably a glycol mixture such as that which is also used as a coolant for internal-combustion engines. Alternatively, it is also possible to use salt solutions which, for reasons of corrosion resistance, may be in the form of NaCl, CaCl$_2$ or MgCl$_2$.

Figure 3:
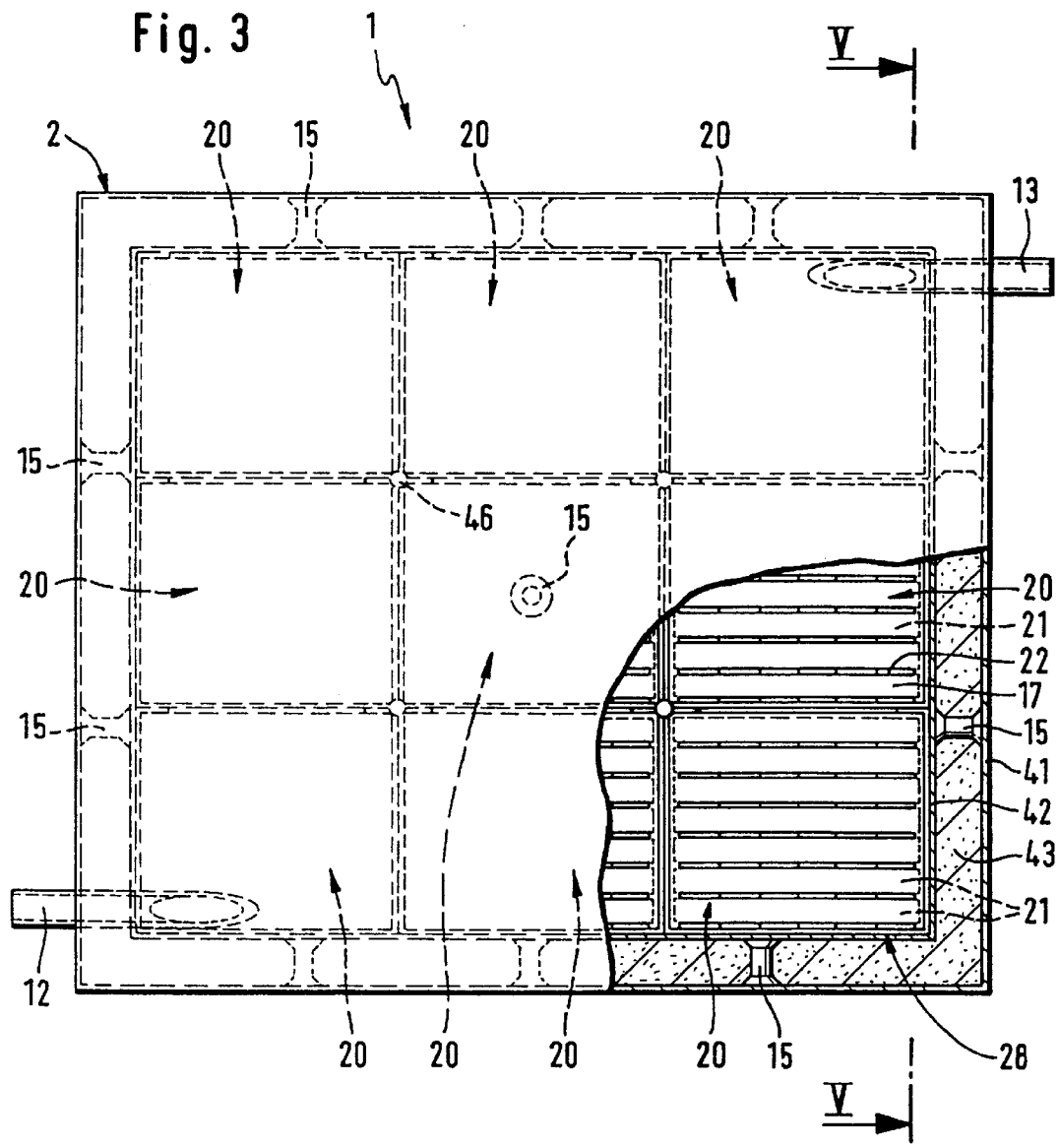
FIG. 3 illustrates an end view of a cooling apparatus with a housing surrounding the storage elements and passages.

FIG. 3 shows an end-side view of a cooling apparatus 1 having a housing 2 which is formed in a sandwich-like structure. The housing 2 includes an outer casing 41 and an inner casing 42. Preferably the outer casing 41 and inner casing 42 are formed of sheet-metal. A hardened foam 43 is located between the casings 41, 42. To ensure that the casings 41 and 42 are at a defined distance apart before the foam 43 hardens, spacer pieces 15 may be provided at specified intervals. As shown in FIG. 3, a plurality of blocks 20 are arranged in the housing 2, each of the blocks 20 includes flattened tubes 22 and enclosures 21 which are stacked on top of one another. FIG. 3 illustrates three blocks 20 are arranged next to one another and above one another, so that there are a total of nine blocks 20. This arrangement provides considerable variability depending on the storage capacity and the configuration of the volume of the blocks. However, it should be understood that other configurations of blocks 20 are within the scope of the present invention.

Figure 4:
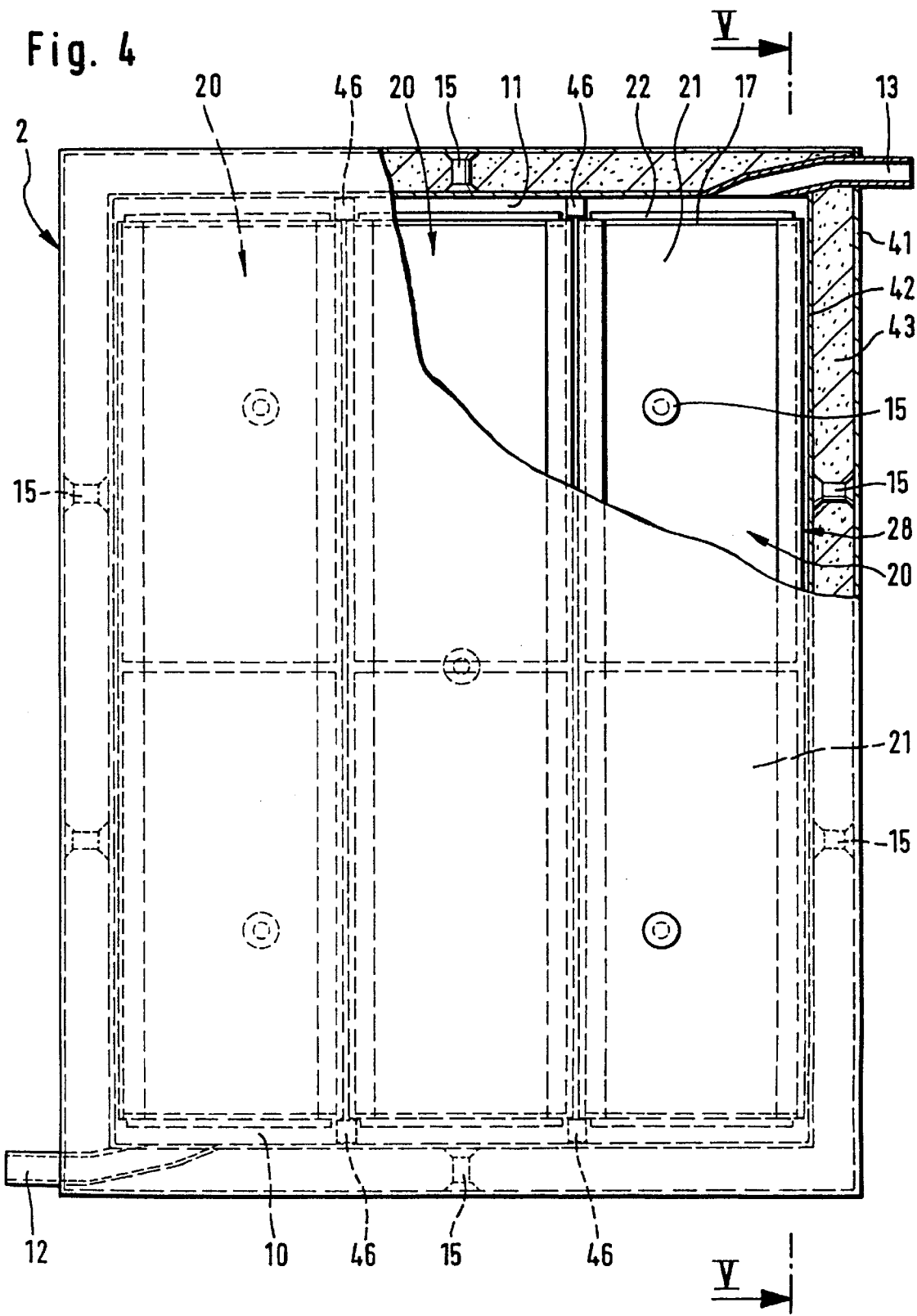
FIG. 4 illustrates a diagrammatic plan view of the cooling apparatus shown in FIG. 3.

FIG. 4 shows a plan view of the cooling apparatus shown in FIG. 3. As can be seen from this figure, the flattened tubes 22 extend over the entire length of the cooling apparatus, while the length of the enclosures 21 corresponds to only about half the length of the flattened tubes 22. It is therefore possible to arrange a plurality of enclosures 21 one behind the other, in the direction of flow.

Figure 5:
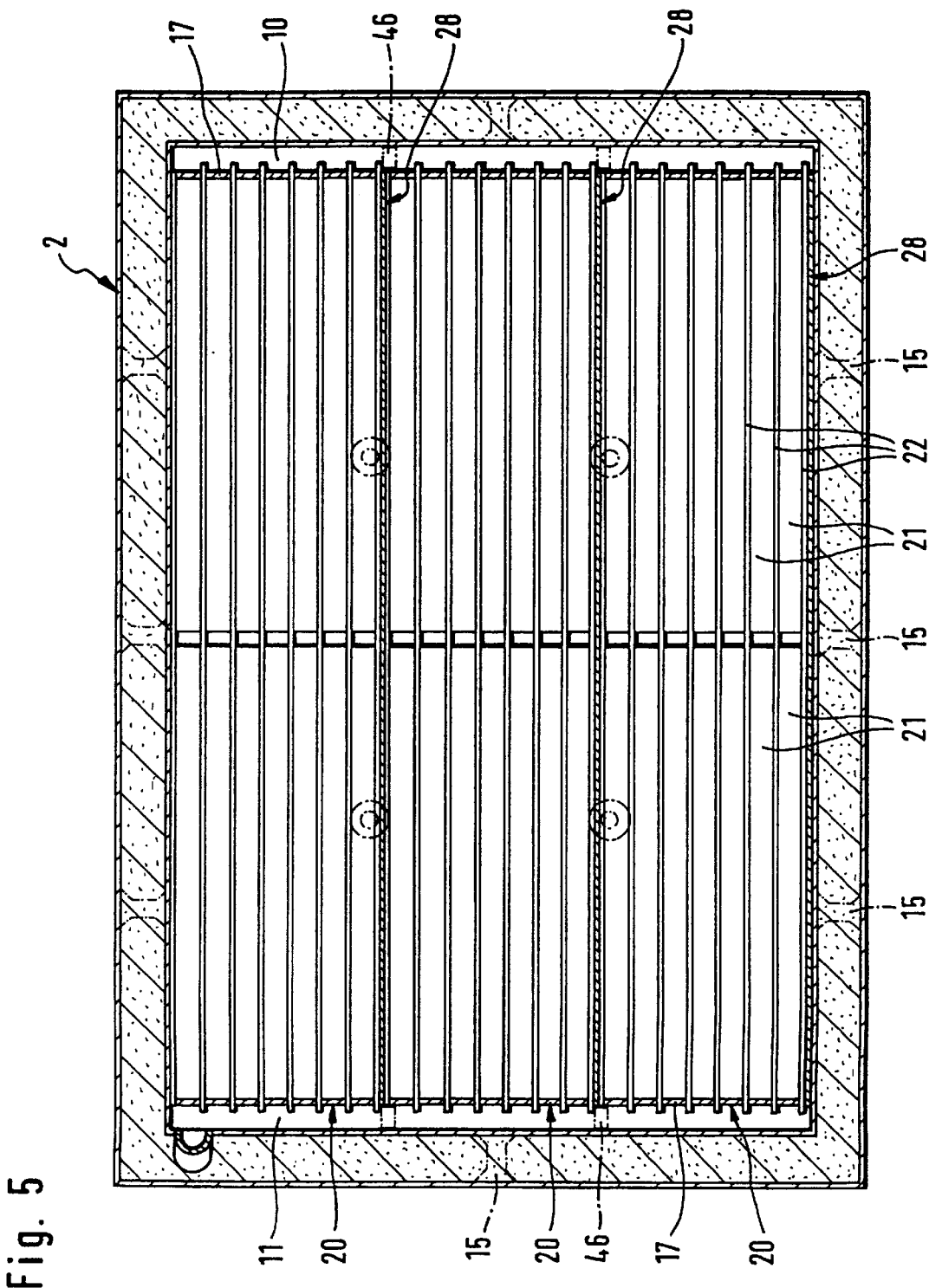
FIG. 5 illustrates a section view from the line V—V in FIGS. 3 & 4.

FIG. 5 shows a section on line V—V in FIGS. 3 & 4. In this case too, each block comprises a plurality of flattened tubes 22 and enclosures 21 which are stacked on top of one another. Two enclosures 21 are provided, one behind the other, on each flattened tube 22. Spacer pieces 46 may be arranged in the distribution and collection chambers 10, 11, so that the blocks 20 are fixed in position and further allowing enough space for the heat-transfer liquid to pass through the apparatus.

Figure 6:
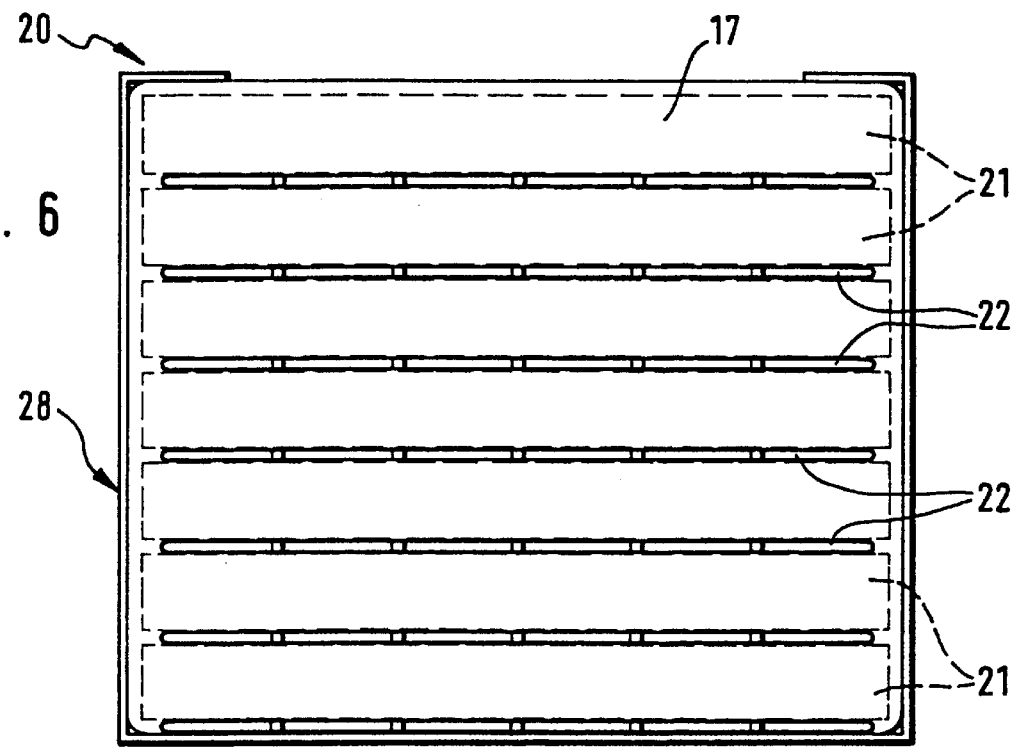
FIG. 6 illustrates the side-end view of an individual block.

FIG. 6 shows an side-end view of an individual block 20. The block 20 includes a plurality of flattened tubes 22 and enclosures 21 which are stacked on top of one another. The entire arrangement is held together by a frame 28. On the end side, the frame 28 has a front plate 17 through which the ends of the flattened tubes 22 are guided.

Figure 7:
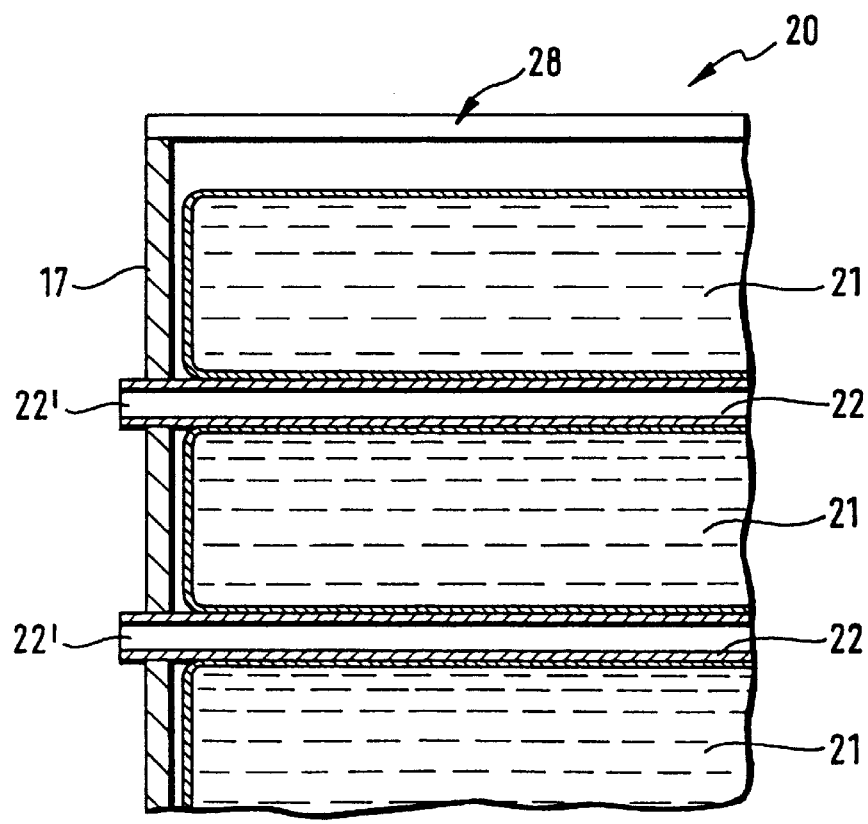
FIG. 7 illustrates an enlarged view of a longitudinal section of a block.

FIG. 7 shows an enlarged view of a portion of a longitudinal section through a block 20. From this figure, it can be seen that a front plate 17, through which the ends 22' of the flattened tubes 22 are guided, is held in the frame 28. The enclosures 21, which may be filled with the cold storage medium, are each located between two flattened tubes 22.

Figure 8:
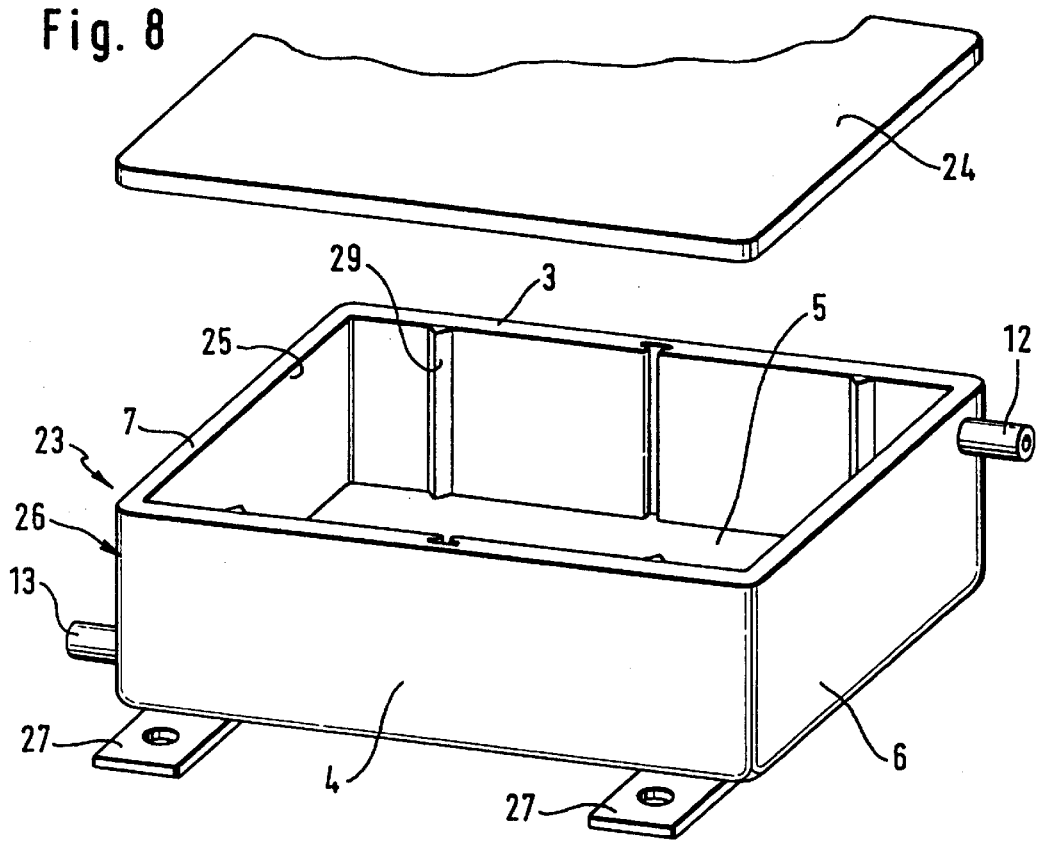
FIG. 8 illustrates a perspective illustration of a second embodiment of a housing according to the present invention.

FIG. 8 shows a housing 23 with a cover 24 which has been removed from the housing 23. The housing 23 and the cover 24 are preferably made from a plastic material, the material thickness being sufficient to form a suitable housing, preferably having a thickness of from about 20 mm to about 30 mm, although other material thicknesses may are also contemplated, depending on the requirements. Double-walled structures with cavities which are filled with foam may also be used. The housing 23 is preferably produced as a single box-like component 26 and, in this particular illustration, includes four walls 3, 4, 6 and 7 and the base 5. An insertion opening 25, which may be used for insertion of the blocks formed from chambers and passages, is formed at the top side of the walls 3, 4, 6, 7. After the blocks have been inserted, the insertion opening 25, may be closed and sealed by a cover 24. This may be done by any conventional method such as, for example, plastic-welding processes, adhesive bonding or mechanical bracing, with the addition of a seal. Preferably the seal is formed by plastic bonding.

Projecting plates 27 may be integrally formed on the bottom edge of the wall 4, in which plates openings are provided for allowing attachment means to pass through. As an alternative to integrally formed plates, the plates 27 may also be provided as insert parts during production of the housing 23. To compensate for manufacturing tolerances in the block width and the space inside the housing 23, strip-like protrusions 29 are provided. The configuration provides an appropriate elasticity, allowing adaptation to the size of the blocks. FIG. 8 also illustrates a feed port 12 provided on the end side 6 and a return port 13 provided on the other end side 7. In the case of a housing 23 made from plastics material, these ports may also be integrally molded.

Figure 9:
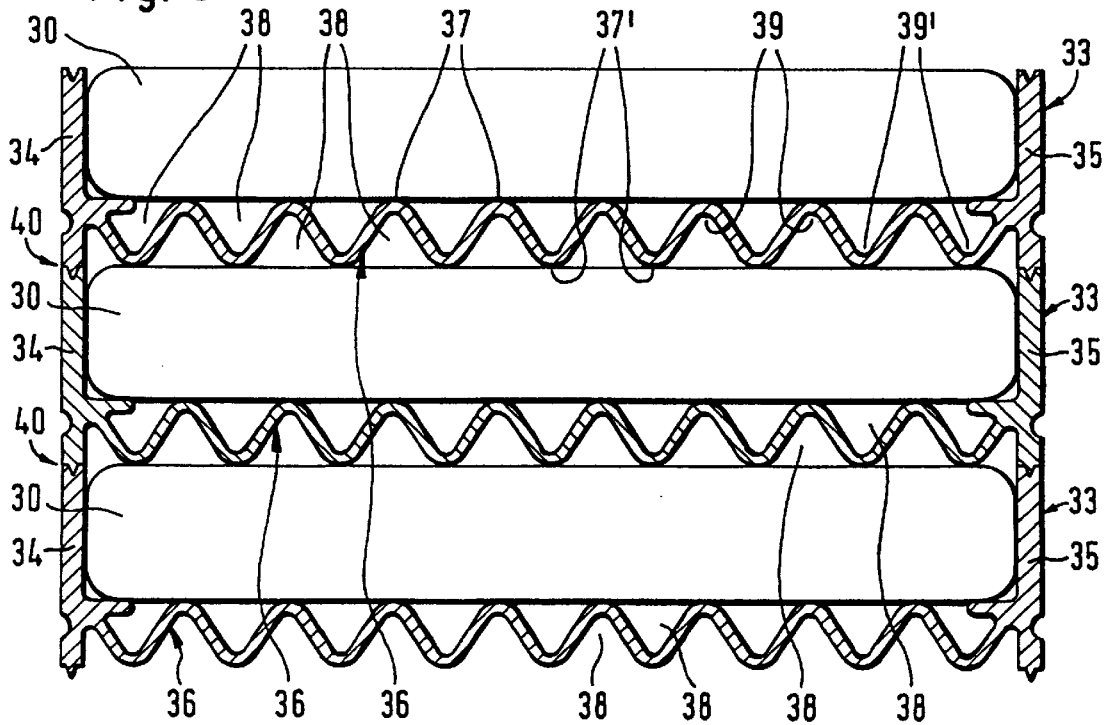
FIG. 9 illustrates an excerpt from the cross section through an alternative embodiment of the block with profile elements.

FIG. 9 shows a portion of the cross section of an alternative embodiment of a block formed from passages and chambers, i.e., the viewing direction corresponds to the direction of flow of the heat-transfer medium. In this case, a plurality of profile elements 33 are stacked on top of one another. The profile elements 33 comprise side strips 34, 35 and a bearing section 36 which extends between the strips 34, 35. The bearing section 36 has a corrugated form transversely with respect to the longitudinal direction of the profile element 33 and is used to support a flexible enclosure 30 which contains the storage medium. The flat sides of the enclosure 30 contact the corrugation peaks 37 and 37', so that passages 38, through which the heat-transfer medium flows, are formed between the corrugation valleys 39 and 39' and the enclosure 30. The height of the side strips 34, 35 is such that the height between the bearing sections 36 of two adjacent profile elements 33 at least approximately corresponds to the corresponding size of the enclosure 30, so that the latter comes into contact with the respective corrugation peaks of the profile elements 33 surrounding it. In order to stack the profile elements 33 on top of one another in such a manner so that they are aligned and cannot shift with respect to one another, the top and bottom edges of the side strips 34, 35 are shaped in such a way that a tongue-and-groove connection 40 is formed. Recesses are arranged on the outsides of the side strips 34, 35, in which recesses projections on laterally arranged tie rods engage, so that the block is held securely together while it is being handled and subsequently installed. The profile elements are preferably produced using an extrusion process and are preferably made from light metal or plastics material.

FIG. 10 shows a flexible enclosure 30 which is filled with the storage medium and is sealed in a liquid-tight manner at the ends of its longitudinal extent. The enclosure 30 is made, for example, from a plastic material which may be easily pressed together and welded at the ends. The enclosure 30 may also be formed from laminated plastic films, if appropriate with an additional outer layer of aluminum. In this way, the enclosure 30 forms a chamber 19 for holding the storage medium. The freezing temperature of the storage medium is preferably between +5° C. and -10° C. A suitable storage medium is tap water. The main constituent of the storage medium is water, to which a gelling agent may be added to make the storage medium easier to process. The gelling agent is preferably a hydrogel. A preferred hydrogel includes a crosslinked, partially neutralized polyacrylic acid. A preferable storage medium contains between about 0.5% by weight and about 30% by weight, most preferably between about 1% by weight and about 2% by weight, hydrogel. To limit the internal pressure when the state of aggregation changes from water to ice, the enclosure 30 should include a suitable air volume, which may, for example, be from about 10% to about 20% of the total volume of the storage medium. However, it is also possible to provide a completely impregnated nonwoven or cellulosic material as filling for the enclosure 30. In such a case, it is possible to dispense with the air in the storage medium.

Reference is still made to FIG. 10. The size of the flexible enclosure 30 is dependent upon many physical factors. An exemplary enclosure 30 may have a total length (L) of the flexible enclosure 30 in the range from about 200 mm to about 300 mm, and preferably about 250 mm. The width (B) of the enclosure 30 may be from about 100 mm and about 150 mm, and is preferably about 125 mm. The height (H) of the flexible enclosure 30 may be in the range from about 10 mm to about 20 mm, and preferably about 14 mm.

FIG. 11 shows a second alternative embodiment of an enclosure 30' which is again formed by a flexible plastic tube and, to this extent, substantially corresponds to the description given with reference to FIG. 10. In order to increase its resistance to internal pressure which develops, the enclosure 30' is pressed together at regular intervals A, in such a manner that the parallel flat sides bear against one another and are welded together by heat. The result is a plurality of part-chambers, the individual length of which is limited, so that the connecting points 32 on the flat sides have an anchoring function. The result is a cushion-like structure of the flexible enclosure 30', with the overall dimensions in terms of length, width and height generally corresponding to the examples discussed with reference to FIG. 10.

FIG. 12 shows a section through a block 50 with profile elements 44 which comprise side strips 45 with bearing sections 47. Support elements 48, 48' are integrally formed on both the top side and the underside of the bearing sections 47, so that there is a distance between the bearing sections 47. A plurality of profile elements 44 are stacked on top of one another, and the flexible enclosures 30 containing the storage medium are located between the individual profile elements 44. The enclosures 30 each contact the support elements 48, 48' of the adjoining bearing sections 47. A plurality of passages 49 for the heat-transfer medium are formed between the outside of the enclosure 30 and the bearing section 47.

FIG. 13 shows a section on line XIII—XIII in FIG. 12. It can be seen that the end side of the block 50 is provided with a mesh element 51. The mesh element 51 includes a thin plate 52 with openings 53. The shape and size of the openings 53 is determined in such a manner that the opening 53 extends over the entire cross section of the passages 49 located on the bearing section 47. Consequently, the mesh element 51 does not present any resistance to the flow of heat-transfer medium. At the level of the inserted enclosures 30, the mesh element 51 is at least partially closed or provided with struts, so that the enclosures 30 containing the storage medium are held in position in the direction of flow of the heat-transfer medium.

Figure 14:
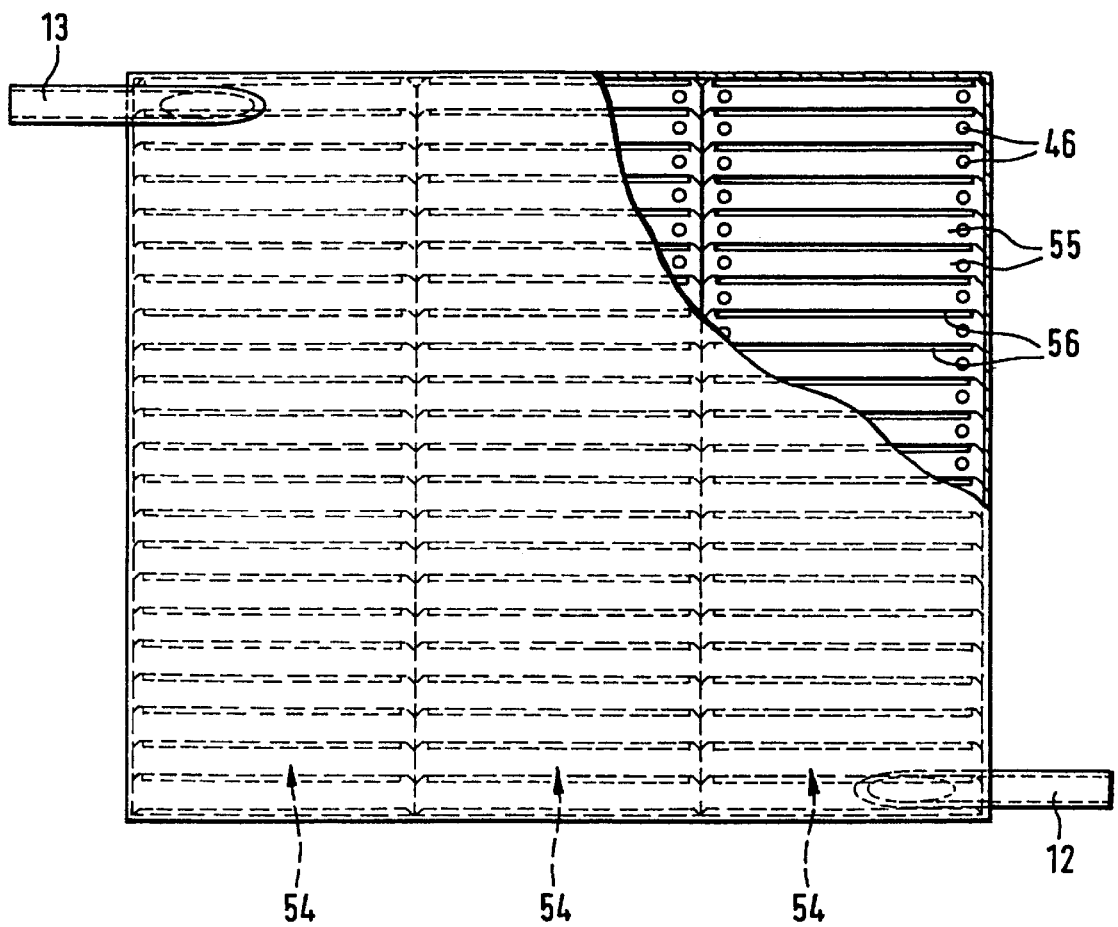
FIG. 14 illustrates a side-end view of a cooling apparatus with three blocks arranged next to one another.

FIG. 14 shows an side-end view of a cooling apparatus before it is installed in a housing. In this case, the cooling apparatus is formed by three blocks 54 which are arranged next to one another and the end sides of which each delimit the distribution and collection chambers to which the feed and discharge connection pieces 12, 13 are connected. Each block 54 includes a plurality of storage elements 55 which, in terms of their ability to store cold, correspond to chambers 19 or enclosures 21 and 30 which have been described above with regard to earlier figures. These storage elements 55 are arranged above one another, by suitable spacer means, in such a manner that passages 56 are formed between two storage elements 55 which lie above one another, and whose passages allow the heat-transfer medium to flow through the passages. Consequently, the flattened tubes described in the preceding figures are not required.

Figure 15:
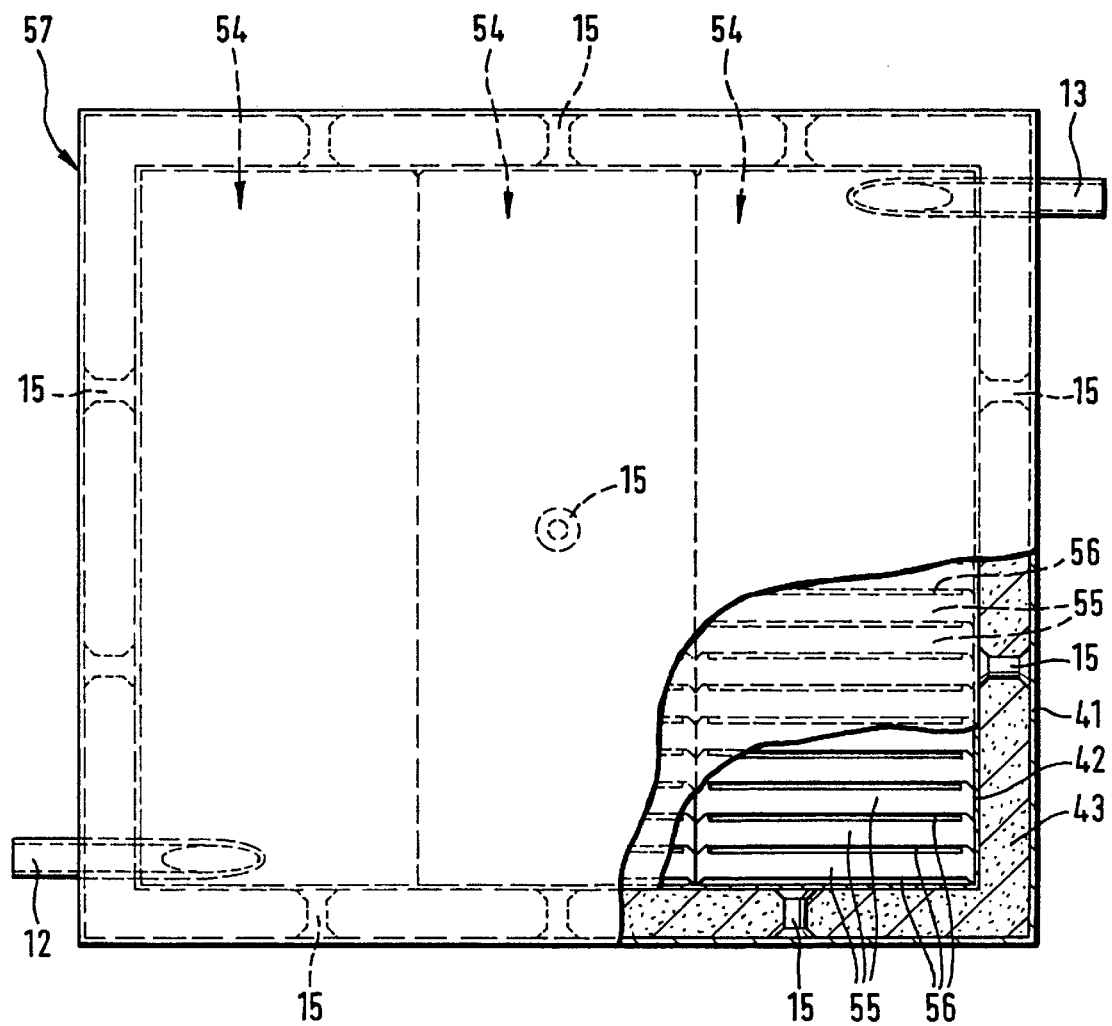
FIG. 15 illustrates a cooling apparatus shown in FIG. 14 including a housing.

FIG. 15 shows the cooling apparatus from FIG. 14 in the position in which it has been installed in a housing 57. The structure of the housing 57 corresponds to that described above with reference to FIG. 3.

Figure 16:
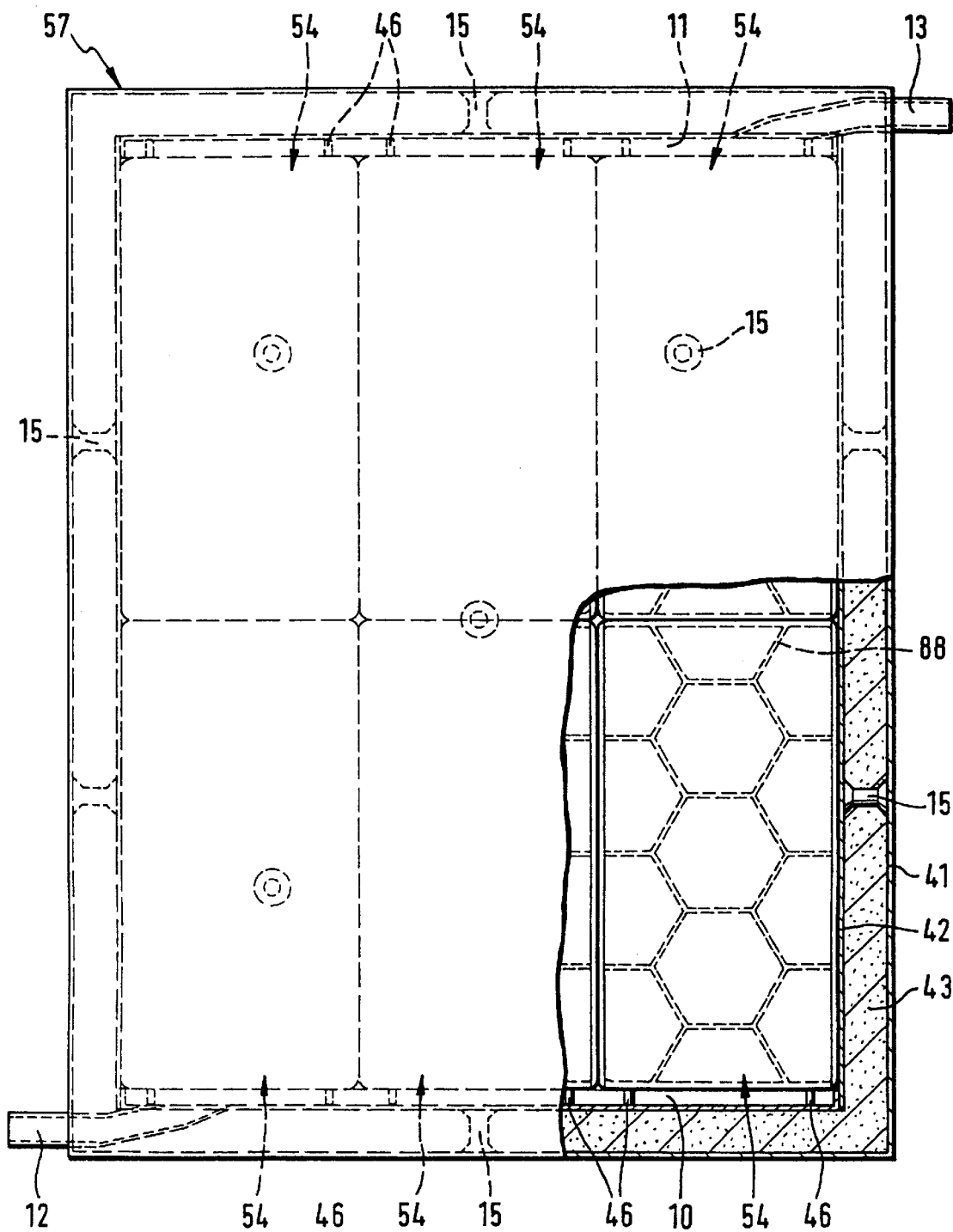
FIG. 16 illustrates a plan view of the cooling apparatus shown in FIG. 15.

FIG. 16 shows a plan view of the cooling apparatus of FIG. 15. This figure illustrates that, as seen in the direction of flow, in each case two blocks 54 are arranged one behind the other, resulting in a total arrangement of six blocks 54. The distribution and collection chambers 10, 11, into which the connection pieces 12, 13 open out, are provided at the end sides of the blocks.

The structure of the storage elements 55 is described in more detail in FIGS. 17 and 18. The storage elements 55 which are used to accommodate the storage medium may be of any suitable shape. Preferably the storage elements 55 are designed as flat cuboids and have a dimensionally stable frame 74. The first side (underside 76) of the frame 74 is spanned by a cover 78, and the second side (top side 80) of which is spanned by a cover 82, resulting in a closed cavity 84 with inner part-volumes 86, 86', 86" for accommodating the storage medium. The cover 78, 82 is preferably a laminated film/foil, and in particular an aluminum composite foil. In order to seal the cavity 84 or a chamber, the cover 78, 82 is connected, preferably sealed, to the frame 74. Inside the frame 74 there are support webs 88 which are of about the same height h as the frame 74 and thus divide the cavity into part-volumes 86, 86', 86". In an alternative structure, covers 78 and 82 are not only connected to the frame 74 but are also connected to the support webs 88, preferably by heat sealing.

Figure 19:
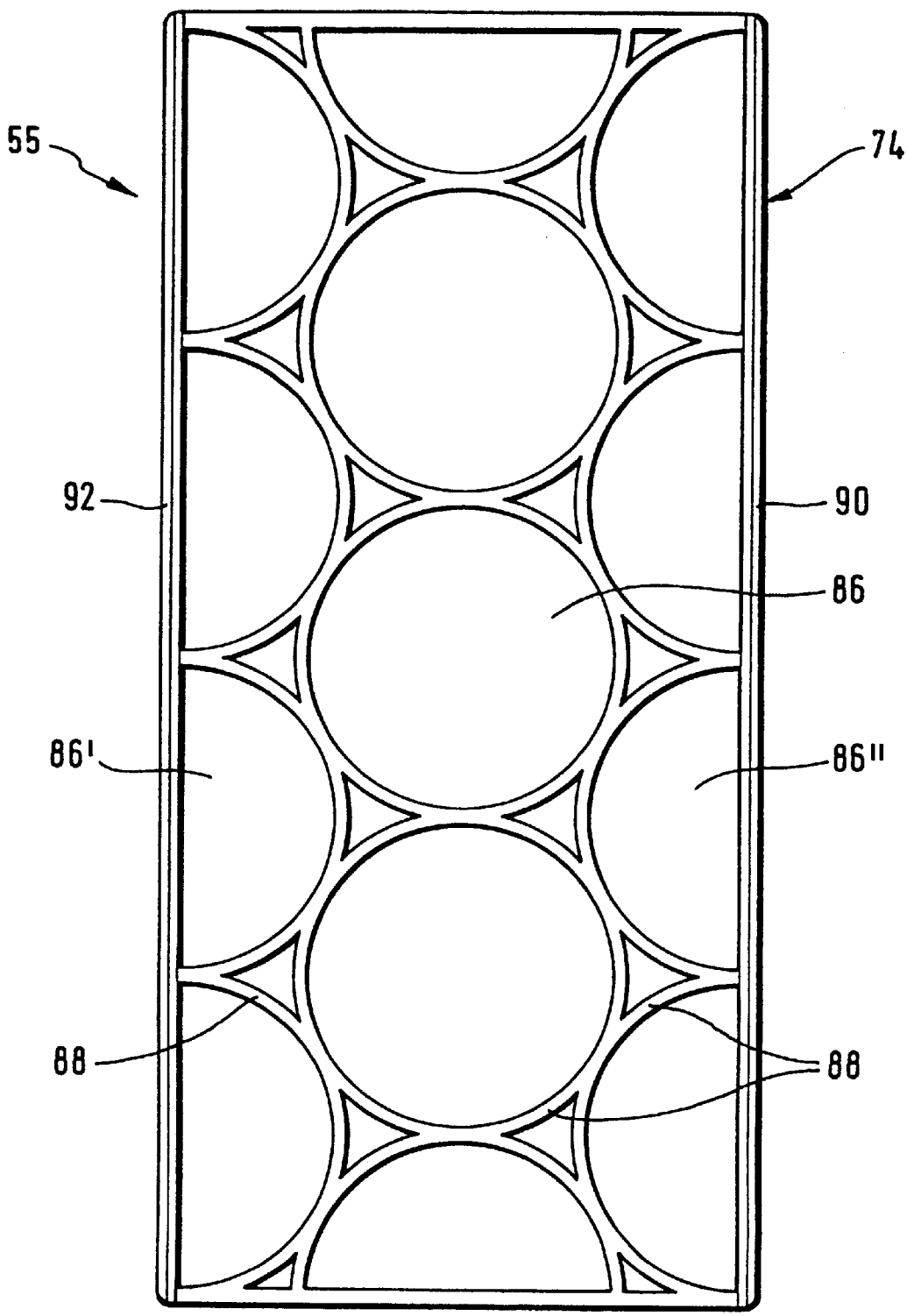
FIG. 19 illustrates an alternative design of a mesh structure.
Figure 20:
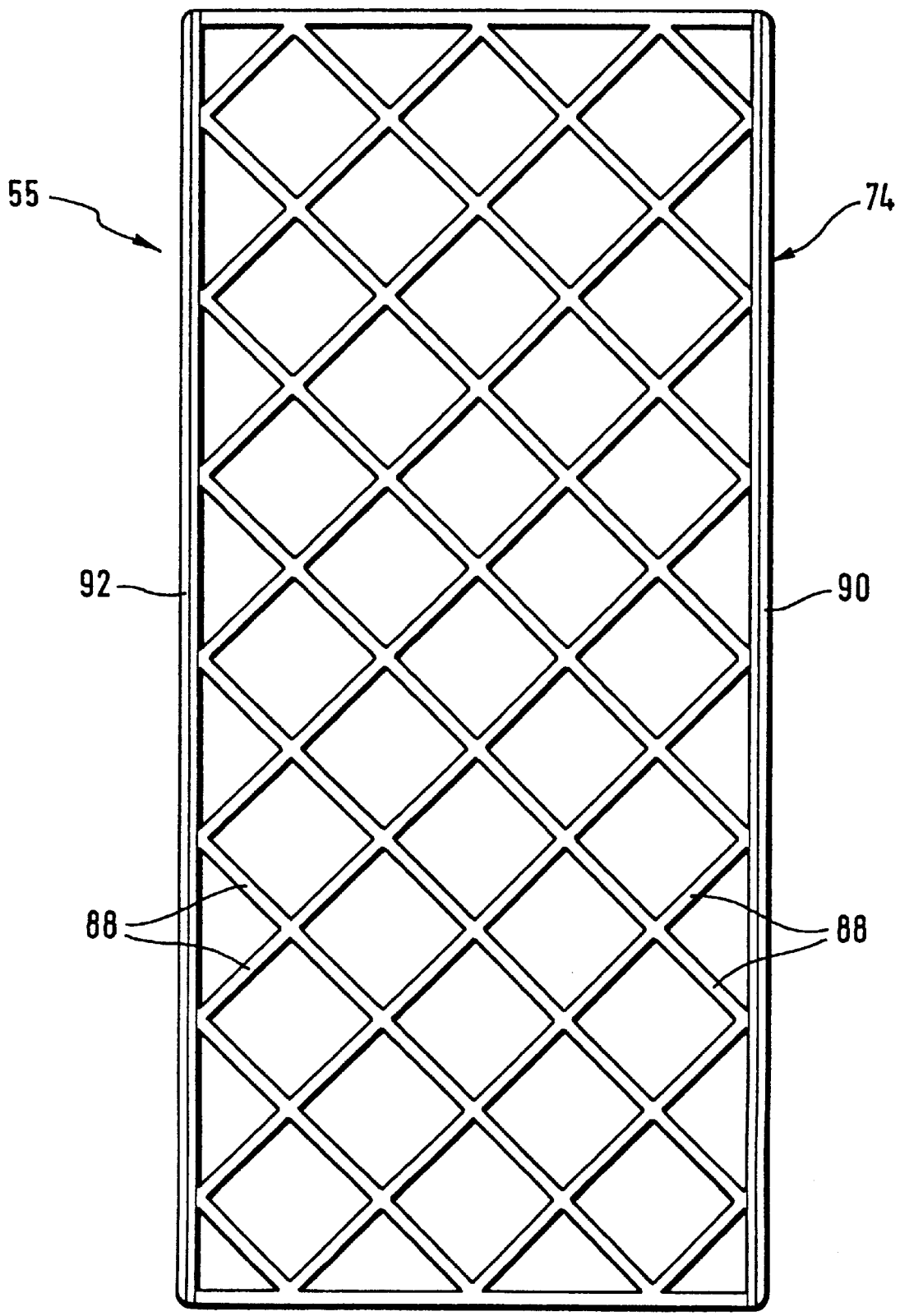
FIG. 20 illustrates a second alternative design of a mesh structure.

The support webs are arranged in such a manner that the part-volumes 86, 86', 86" preferably have a hexagonal contour, as shown in FIG. 17. A honeycomb structure of this nature has a particularly high stability. However, the support webs 88 could also be arranged in any other desired way, as shown, for example, in FIGS. 19 and 20.

Spacers 94 and 96 or 98 and 100 are arranged on longitudinal limbs 90 and 92 of the frame 74. The spacers, in the exemplary embodiment illustrated, are designed as web-like elevations which run along the direction of flow 81. Other forms of spacers 94, 96, 98, 100 are also contemplated. The spacers 94 and 96 are arranged on the top side 80 of storage elements 55, in a corresponding manner to the spacers 98 and 100 on the underside 76. When a plurality of storage elements 55 are stacked on top of one another, the spacers 94 and 96 on the top side 80 of a cooling apparatus element engage with the spacers 98 and 100 on the underside 76 of the cooling apparatus element stacked above it. Thus, the storage elements 55, which have been stacked on top of one another, are held in a fixed position at least in the transverse direction with respect to the web-like spacers 94, 96, 98, 100. The height of the spacers 94, 96, 98, 100 defines the height of the flow passages 56 which are thus formed between the cooling apparatus elements stacked on top of one another.

On the outside of the frame 74, the storage elements 55 may have support elements 80 to hold the storage elements 55 in position with respect to the housing 57, specifically in the direction of flow. The support elements 80, and the distance which they define between the storage elements 55 and the housing wall having the feed 12 or discharge 13, also form the distribution space 70 and the collection space 71 in front of and behind the storage elements 55. The storage elements 55 or a plurality of adjacent blocks composed of storage elements 55 can be introduced in a tightly-fitting manner in the direction which is transverse with respect to the direction of flow 81. The internal dimension of the housing 57 in the direction which is transverse with respect to the direction of flow preferably corresponds to an integer multiple of the width of the storage elements 55. Of course, this only applies to storage elements 55 which are cuboid-shaped. Preferably, the frame 74 of a storage element 55, at its end facing toward the feed or discharge 12 or 13, respectively, is of suitable design in terms of fluid mechanics, for example, is rounded, in order to reduce the pressure losses in the flow of heat-transfer medium.

It should be noted that the storage elements 55 do not necessarily have to be in the shape of a cuboid, but rather could also be of some other shape which is matched to the housing 57. However, it is preferable that the storage elements 55 fulfill the following three functions: (i) holding the storage medium, (ii) forming the flow passages 56 when the cooling apparatus elements are stacked on top of one another and (iii) fixing the position of the cooling apparatus elements when they are inserted into the housing 57.

The storage elements 55 described above can be produced using a process which includes producing the frame 74 of the storage elements 55, together with its spacers 94, 96, 98, 100 and support elements 46, and the support webs 88, from plastics material, for example a polyolefin, in an injection-molding process. Then, one side of the storage elements 55, for example, the underside 76, is connected to a laminated film/foil, i.e., the cover 78, preferably by heat-sealing. The individual chambers 86', which are open at the top, are then filled with the gelling agent/water mixture, for example, by spreading the gel-like mixture into the chambers 86'. Next, the second cover 82 is put in place and is connected to the frame 74 and the webs 88, likewise by heat-sealing, so that the interior chamber in which the storage medium is located is hermetically sealed. Then, the storage elements 55, which have been manufactured in this way, are inserted in the housing 57 and are stacked on top of one another and next to one another in the housing 57, after which the housing 57 is closed.

Figure 21:
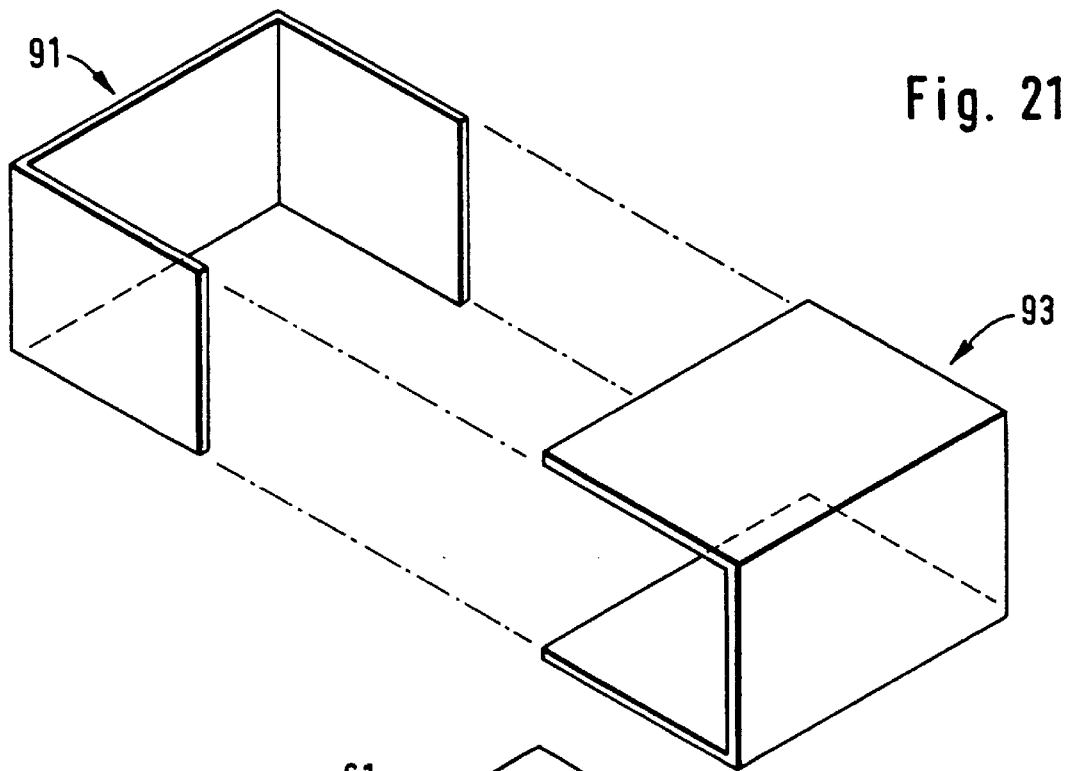
FIG. 21 illustrates two complementary housing parts.

FIG. 21 shows two housing parts 91, 93 which can be assembled to form a closed cuboid and, in this way, form a housing 57 or two of the designs described above. Each of the housing parts 91, 93 is designed in the shape of a U and comprises three sides of the cuboid which is to be formed. While the housing parts 91, 93 are shown in a U shape, it should be understood that other shapes are clearly contemplated and understood to the person having ordinary skill in the art.

Figure 22:
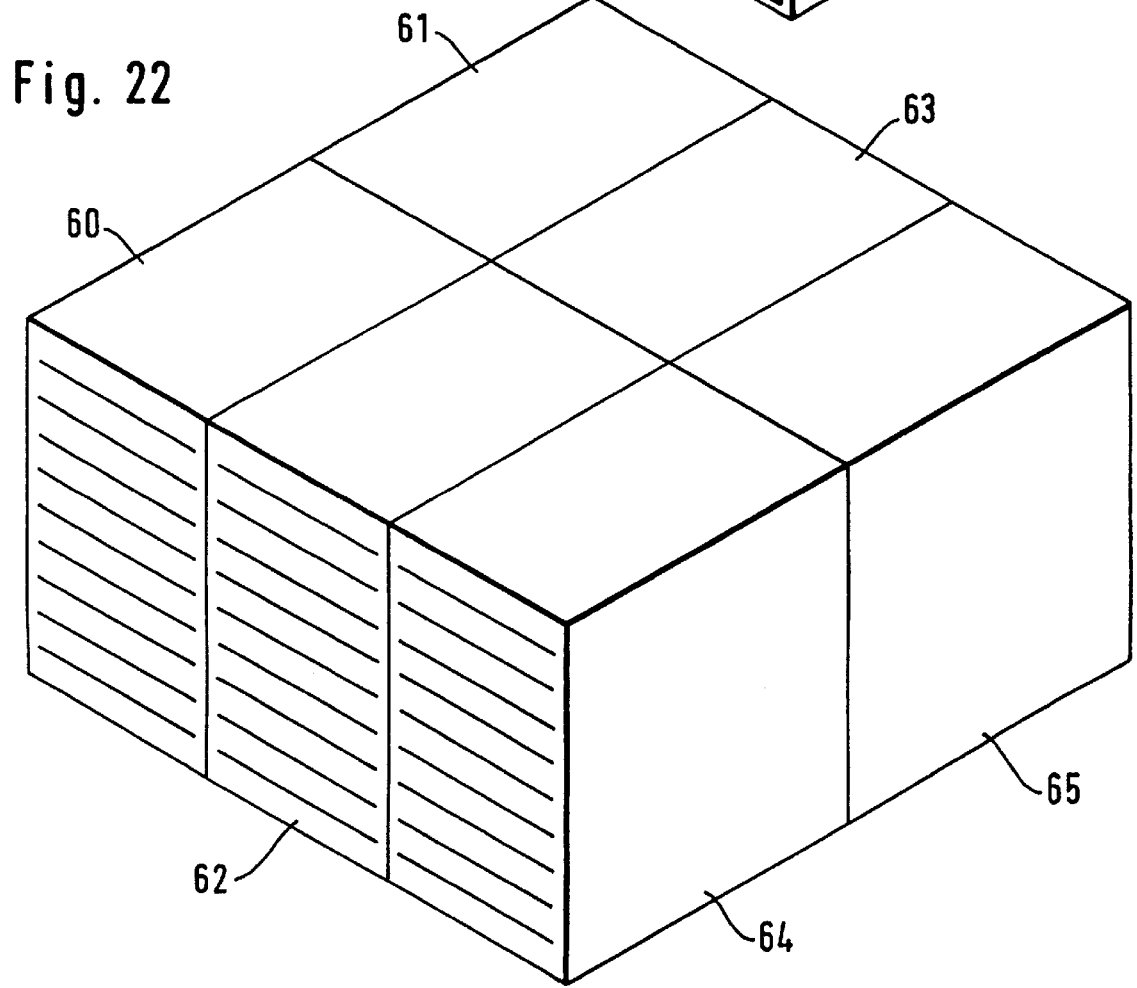
FIG. 22 shows a diagrammatic illustration of a cooling apparatus formed from a plurality of blocks.

FIG. 22 shows a diagrammatic illustration of a cooling apparatus, which is formed from a plurality of blocks 60 to 65, without the housing surrounding the cooling apparatus. In this case, the arrangement of the blocks 60 to 65 is such that in each case two blocks 60, 61 or 62, 63 or 64, 65 lie one behind the other in the direction of flow of the heat-transfer medium. These groups, which are each composed of two blocks, are arranged laterally next to one another. The front edges are aligned with respect to one another and forms the boundary of the distribution and collection chambers.

In the exemplary embodiments described, the storage elements or enclosures are always shown as substantially flat elements. However, it is also possible for enclosures of similar cross-sectional shape in their longitudinal extent to be shaped into a curved path as an arc or even into a ring. Furthermore, it is possible to arrange a plurality of accumulator elements in the form of a spiral, in which case the turns of the spiral are at a sufficient distance apart for the heat-transfer medium to flow through.

Similarly, the process described above is but one method of many that could be used. Accordingly, the above description and accompanying drawings are only illustrative of preferred embodiments which can achieve the features and advantages of the present invention. It is not intended that the invention be limited to the embodiments shown and described in detail herein. The invention is only limited by the scope of the following claims.

German Patent Application No. 198 57 121.6 filed on Dec. 11, 1998 and German Patent Application No. 199 50 673.6 filed on Oct. 21, 1999, including the specification, figures, claims and abstract are expressly incorporated by reference in their entirety.

What is claimed as new and desired to be protected by Letters Patent of the United states is:

1. A cooling apparatus comprising:
    a housing having a plurality of chambers arranged therein, wherein the chambers are sealed and are filled with a storage medium;
    passages which carry a heat-transfer medium and extend between the chambers, the chambers of a group being combined to form a block; and
    at least one passage provided between each pair of adjacent chambers, wherein each of the passages is connected to distribution and collection chambers formed in the housing and wherein the housing includes at least one feed port and at least one return port.

2. The cooling apparatus according to claim 1, wherein the freezing temperature of the storage medium is between +5° C. and -10° C.

3. The cooling apparatus according to claim 1, wherein the chambers extend in substantially planar form and are arranged parallel to one another.

4. The cooling apparatus according to claim 3, wherein the chambers are spaced at a predetermined distance by a support.

5. The cooling apparatus according to claim 1, wherein two or more blocks are adjacent to one another.

6. The cooling apparatus according to claim 1, wherein the housing is substantially cuboid-shaped and further is provided with an attachment means.

7. The cooling apparatus according to claim 6, wherein the housing is a multilayer structure formed of a light metal sheet with an insulating jacket.

8. The cooling apparatus according to claim 1, wherein the feed port and return port are arranged such that the direction of flow runs in the longitudinal extent of the distribution and collection chambers and substantially transversely to the direction of the passages.

9. The cooling apparatus according to claim 1, wherein the storage medium includes tap water.

10. The cooling apparatus according to claim 9, wherein the chambers contain, in addition to the storage medium, a residual gas volume of from about 10% to about 20%.

11. The cooling apparatus according to claim 9, wherein a completely impregnated, absorbent material is provided in the chambers.

12. The cooling apparatus according to claim 11, wherein said absorbent material is a nonwoven or cellulosic material.

13. The cooling apparatus according to claim 9, wherein a hydrogel is provided as a gelling agent.

14. The cooling apparatus according to claim 13, wherein the hydrogel is a crosslinked, partially neutralized polyacrylic acid.

15. The cooling apparatus according to claim 13, wherein the hydrogel content is from about 0.5% by weight to about 30% by weight of the storage medium.

16. The cooling apparatus according to claim 13, wherein the hydrogel content is between 1% by weight and 2% by weight of the storage medium.

17. The cooling apparatus according to claim 1, wherein the chamber is formed by a dimensionally stable frame which is spanned on both sides by a cover, and wherein at least one chamber inside the frame is hermetically sealed.

18. The cooling apparatus according to claim 17, wherein the cover is a laminated film or a foil.

19. The cooling apparatus according to claim 18, wherein said cover is an aluminum composite foil.

20. The cooling apparatus according to claim 17, wherein spacers are arranged on the frame to keep cold storage elements, which are stacked on top of one another, spaced apart to form passages between said storage elements.

21. The cooling apparatus according to claim 20, wherein the spacers are designed as web-like elevations which run in the direction of flow along the edges of the frame, the spacers being arranged in such a manner that cold storage elements are held fixed in position in the transverse direction with respect to the elevations.

22. The cooling apparatus according to claim 17, wherein support elements are arranged on the outside of the frame, which fix the cold storage element in the housing.

23. The cooling apparatus according to claim 17, wherein support webs, which are of the same height (h) as the frame, are arranged inside the frame, and wherein the cover is connected to the frame and the support webs so as to form individual chambers inside the accumulator element.

24. The cooling apparatus according to claim 23, wherein the support webs are arranged in such a manner that chambers, forming partial volumes, are formed having a hexagonal contour.

25. The cooling apparatus according to claim 1, wherein the chambers are of substantially flat cross section and comprise a flexible enclosure made from a plastic material, the ends of said enclosure being welded or bonded together.

26. The cooling apparatus according to claim 25, wherein the flat sides of said enclosures, in the longitudinal extent of the enclosure, are fixed together at predetermined intervals (A).

27. The cooling apparatus according to claim 26, wherein a support means is formed between the enclosures and serves as passages for the heat-transfer medium.

28. The cooling apparatus according to claim 25, wherein at least two flexible enclosures or storage elements are arranged behind one another in the longitudinal direction of the passages.

29. The cooling apparatus according to claim 24, wherein profiled elements are provided with two parallel side strips and a bearing section for the enclosures is formed between said parallel side strips.

30. The cooling apparatus according to claim 29, wherein the bearing section is corrugated in cross section, the enclosures contacting each of the corrugation peaks forming an intermediate spaces which serve as passages for the heat-transfer medium.

31. The cooling apparatus according to claim 29, wherein the bearing section is designed as an elongate web between the side strips and is provided with support elements which are formed integrally on the top side and the underside, the enclosures contacting the support elements, while the passages for the heat-transfer medium are formed between the support elements on one side.

32. The cooling apparatus according to claim 1, wherein the length (L) of the chambers or storage elements is from about 200 mm and about 300 mm, the width (B) is from about 100 mm to about 150 mm, and the height (H) is from about 10 mm to about 20 mm.

33. The cooling apparatus according to claim 32, wherein the length (L) of the chambers or storage elements is from about 250 mm to 260 mm, the width (B) is about 125 mm, and the height (H) is from about 14 mm.

34. The cooling apparatus according to claim 29, wherein the side strips of the profile elements are designed, at the top and bottom edges, to connect in a form-fitting manner to the next profile element, this connection preferably being a tongue-and-groove connection.

35. The cooling apparatus according to claim 1, wherein the housing comprises two housing parts, each of the housing parts being U-shaped, and wherein the housing parts form a cuboid in the assembled state.

36. The cooling apparatus according to claim 1, wherein the apparatus is used to cool a vehicle passenger compartment.

37. The cooling apparatus according to claim 1, wherein the chambers have a substantially flat cross section.

* * * * *